United States Patent
Saleh et al.

(10) Patent No.: US 12,429,418 B2
(45) Date of Patent: Sep. 30, 2025

(54) PHASE-RESOLVED OPTICAL METROLOGY FOR SUBSTRATES

(71) Applicant: Applied Materials, Inc., Santa Clara, CA (US)

(72) Inventors: Nedal Saleh, San Jose, CA (US); Zhiming Jiang, Pleasanton, CA (US); Xiaodong Zhang, Sunnyvale, CA (US); Arun Ramaswamy Srivatsa, Fremont, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 196 days.

(21) Appl. No.: 18/389,316

(22) Filed: Nov. 14, 2023

(65) Prior Publication Data
US 2024/0201077 A1 Jun. 20, 2024

Related U.S. Application Data (60) Provisional application No. 63/432,608, filed on Dec. 14, 2022.

(51) Int. Cl.
*G01N 21/31* (2006.01)
*G01N 21/3563* (2014.01)

(52) U.S. Cl.
CPC ..... *G01N 21/3103* (2013.01); *G01N 21/3563* (2013.01); *G01N 2021/3568* (2013.01); *G01N 2201/126* (2013.01)

(58) Field of Classification Search
CPC .......... G01N 21/3103; G01N 21/3563; G01N 2021/3568; G01N 2201/126
See application file for complete search history.

(56) References Cited

U.S. PATENT DOCUMENTS

| 7,773,230 | B2 | 8/2010 | Pfaff |
| 9,085,045 | B2 | 7/2015 | Scheer et al. |
| 9,182,280 | B1 | 11/2015 | Gardner et al. |
| 2005/0070087 | A1* | 3/2005 | Braunisch ........... H01L 23/5226 438/622 |
| 2007/0260422 | A1* | 11/2007 | Marcus .............. G01B 11/0683 702/172 |
| 2010/0315646 | A1 | 12/2010 | Chism |
| 2019/0120753 | A1 | 4/2019 | Prater et al. |
| 2021/0242064 | A1 | 8/2021 | Chen et al. |

FOREIGN PATENT DOCUMENTS

WO WO 2011-014282 A2 2/2011
WO PCT/US2023/083581 * 7/2025

OTHER PUBLICATIONS

International Search Report for PCT/US2023/083561, dated Apr. 9, 2024.

* cited by examiner

*Primary Examiner* — Hugh Maupin
(74) *Attorney, Agent, or Firm* — Moser Taboada (57) ABSTRACT

The methods and apparatus provide phase-resolved optical metrology for determining qualities of a substrate and films thereon. Transmitted and reflected signals are coupled using both amplitude and phase information to improve the metrology information obtained from film layers on the substrate.

20 Claims, 4 Drawing Sheets

PHASE-RESOLVED OPTICAL METROLOGY FOR SUBSTRATES

CROSS-REFERENCE TO RELATED APPLICATIONS

This application claims benefit of U.S. provisional patent application Ser. No. 63/432,608 filed Dec. 14, 2022, which is herein incorporated by reference.

FIELD

Embodiments of the present principles generally relate to semiconductor processing of semiconductor substrates.

BACKGROUND

During semiconductor processing, different materials are deposited or grown on substrates to form various structures. Metrology is performed on the substrates after processing to ensure that the required parameters are met to enable high quality semiconductors. Metrology systems can be used, for example, to check film quality and composition by using optical metrology techniques to determine absorption curves for a range of wavelengths for a substrate. A reflection absorption curve and a transmission absorption curve are traditionally obtained through detection of amplitudes of various wavelengths that are reflected from the substrate's surface and transmitted through the substrate, respectively. The information about the substrate must be known prior to the metrology processing in order to subtract the substrate's characteristics from the data. The inventors have observed, however, that such metrology systems slow throughput and even limit metrology testing in some situations where the substrate information cannot be obtained. In addition, the inventors have observed, that as layer thicknesses and variations of compositions require higher and higher resolutions to resolve, the amplitude-based metrology systems cannot meet the increased demands.

Accordingly, the inventors have provided methods and apparatus to substantially increase resolution capabilities of optical metrology systems while increasing testing throughput and reducing costs.

SUMMARY

Methods and apparatus for phase-resolved optical metrology are provided herein.

In some embodiments, a method for determining an absorption profile for a film on a substrate may comprise illuminating the substrate with a broadband spectrum, obtaining amplitude and phase for reflection beams from a first surface of the substrate, obtaining amplitude and phase for transmission beams propagating through the substrate and beyond a second surface of the substrate, forming a model of the substrate by coupling the amplitude and phase of the reflection beams and the amplitude and phase of the transmission beams to form a phase-resolved signal with a first sub-signal at a first end of a Standing-Wave-Ratio (SWR) envelope that resolves top layer information and a second sub-signal at a second end of the SWR envelope that resolves substrate bulk information, determining the absorption profile of the film on the substrate and the substrate based on the model of the substrate, and using the absorption profile to perform a corrective action during processing of the film or substrate.

In some embodiments, the method may further include a film that is an epitaxial layer, processing of a film or substrate that includes physical vapor deposition, chemical vapor deposition, or resist layer deposition, a film that has a thickness of one atomic layer, a film that is a stack of two or more film layers, a substrate that is silicon, silicon carbide, quartz, or sapphire, a broadband spectrum that includes wavelengths of approximately 2 microns to approximately 20 microns, a single source that is used to illuminate the substrate, obtaining the amplitude and phase of the transmission beams and the amplitude and phase of the reflection beams that includes scanning at a speed that resolves fringes of amplitudes and phases, performed without prior substrate pre-measurements, and/or a film that is composed of an unknown material.

In some embodiments, a non-transitory, computer readable medium having instructions stored thereon that, when executed, cause a method for determining an absorption profile for a film on a substrate to be performed, the method may comprise illuminating the substrate with a broadband spectrum, obtaining amplitude and phase for reflection beams from a first surface of the substrate, obtaining amplitude and phase for transmission beams propagating through the substrate and beyond a second surface of the substrate, forming a model of the substrate by coupling the amplitude and phase of the reflection beams and the amplitude and phase of the transmission beams to form a phase-resolved signal with a first sub-signal at a first end of a Standing-Wave-Ratio (SWR) envelope that resolves top layer information and a second sub-signal at a second end of the SWR envelope that resolves substrate bulk information, and determining the absorption profile of the film on the substrate and the substrate based on the model of the substrate.

In some embodiments, the non-transitory, computer readable medium may further include a method with a broadband spectrum that includes wavelengths of approximately 2 microns to approximately 20 microns, a film is a stack of two or more film layers, obtaining the amplitude and phase of the transmission beams and the amplitude and phase of the reflection beams includes scanning at a speed that resolves fringes of amplitudes and phases, and/or the method performed without prior substrate pre-measurements.

In some embodiments, a metrology apparatus for determining an absorption profile for a film on a substrate may comprise a broadband illumination source configured to produce an infrared (IR) illumination band beam, a beam splitter configured to split the IR illumination band beam, a fixed mirror configured to receive the IR illumination band beam, a movable mirror configured to receive the IR illumination band beam and move to alter resolution of the metrology apparatus, a reflection detector configured to obtain amplitude and phase of a reflection of the IR illumination band beam, a transmission detector configured to obtain amplitude and phase of a transmission of the IR illumination band beam through the film and the substrate, and a controller configured to alter a step distance of the movable mirror to less than a shortest wavelength in the IR illumination band beam or to alter a velocity of the movable mirror to a lowest possible continuous velocity where the reflection detector and the transmission detector are configured to detect at a sampling rate greater than the velocity divided by a shortest wavelength of the illumination band beam.

In some embodiments, the metrology apparatus may further include an IR illumination band beam that includes wavelengths of approximately 2 microns to approximately 25 microns, a step distance is less than approximately 2 microns, and/or a sampling rate is approximately 100 Hz.

Other and further embodiments are disclosed below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the principles and are thus not to be considered limiting of scope, for the principles may admit to other equally effective embodiments.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

The methods and apparatus provide phase-resolved optical metrology for determining qualities of a substrate. Transmitted and reflected signals are coupled using both amplitude and phase information to improve the metrology information obtained from film layers on the substrate. Throughput, cost, sensitivity, and accuracy improvements of over tenfold may be obtained using the present principles over traditional methods. In addition, the need for bare substrate measurements prior to metrology testing is completely eliminated, expanding testing situations, reducing metrology costs, and creating "on-demand" metrology testing where not previously possible. The present principles also have the benefit of improving the accuracy of the metrology measurements to detect slight substrate changes cause by processing such as, for example but not limited to, epitaxial growth, annealing, diffusion, and the like. The methods may be used for films deposited by physical vapor deposition or chemical vapor deposition, films grown by epitaxial growth, and/or resists and the like.

The methods and apparatus of the present principles leverage phase-resolved optical metrology techniques based on, but not limited to, Raman spectroscopy or Fourier transform infrared (FTIR) spectroscopy or the like. The techniques provided herein are not limited to only infrared wavelengths and may be applied to other wavelengths. Solely for the sake of brevity, examples herein are based on FTIR spectroscopy but are not meant to be limited to only FTIR-based spectroscopy. FTIR's sensitivity diminishes for advanced process ultrathin films rendering traditional FTIR methods unusable for process or equipment development. The requirement of pre-measurements for substrates in traditional FTIR methods also increases costs and reduces throughput. Moreover, traditional FTIR methods use two independent channels, one reflection channel and one transmission channel that only includes amplitude signals. The inventors have found that the use of only amplitude signals in two separate channels induces errors and causes the FTIR metrology to be incomplete.

In some embodiments, the phase signals of FTIR measurements of reflected signals and also transmitted signals of a substrate are used to improve accuracy and/or sensitivity of the signals. The amplitude and phase signals of the reflected signal and the transmitted signal are coupled together, enabling use with ultrathin films and advanced processes and allowing 'on-demand' FTIR-based metrology without requiring bare substrate pre-measurements. The phase in the FTIR signal is measured by setting up testing parameters to spectrally resolve the phase in the transmitted and reflected signals. The phase-resolved signal creates two sub-signals at both ends of the standing-wave-ratio (SWR) envelopes such that one sub-signal resolves the film layers on the top of a substrate while the other sub-signal contains additional substrate bulk information. In so doing, the FTIR workflow problems are solved such as significant improvement in FTIR sensitivity, throughput, and cost as the need for bare substrate pre-measurements are eliminated; enablement of otherwise prohibited applications caused by lack of substrate pre-processing information and creating on-demand FTIR solutions particularly important in high-volume manufacturing and production; improvement of accuracy of FTIR measurements since the substrate may change by processing; and/or reflection and transmission coupled channels through bulk substrate which further improves the value of the FTIR analysis.

The methods and apparatus of the present principles can be used to perform metrology on a substrate with known or unknown films on the substrate. The substrate may be, for example, silicon, silicon carbide, quartz, sapphire, and the like. The substrate gives reflections from both sides (upper surface and lower surface) and can be treated as an etalon (discussed in more detail below). The substrate is exposed to a single illumination source and does not require any additional external forces, probes, or effects to generate additional responses to that need to be measured. The present principles also detect reflection and transmission emissions from the illumination source simultaneously and leverage analytical/numerical co-optimization of the reflection and transmission captured data. All diffraction orders used in the analysis are in the frequency domain. The metrology data is used to ascertain intrinsic characteristics of the substrate (and film layers) that are temporally static (non-transitory properties). In some embodiments, existing hardware may be used without requiring modifications to the hardware, increasing sensitivity of the metrology apparatus without expensive changes. The resulting absorption profiles obtained by the metrology techniques herein can be used to analyze the film or substrate materials to detect such characteristics as doping levels, presence of certain molecular bonds, effects caused by annealing, and the like that may not be obtainable with traditional metrology techniques. The resulting absorption profiles may also be used to perform corrective actions during processing of the film and substrate for quality control such as thickness, composition, and/or purity and the like.

Figure 1:
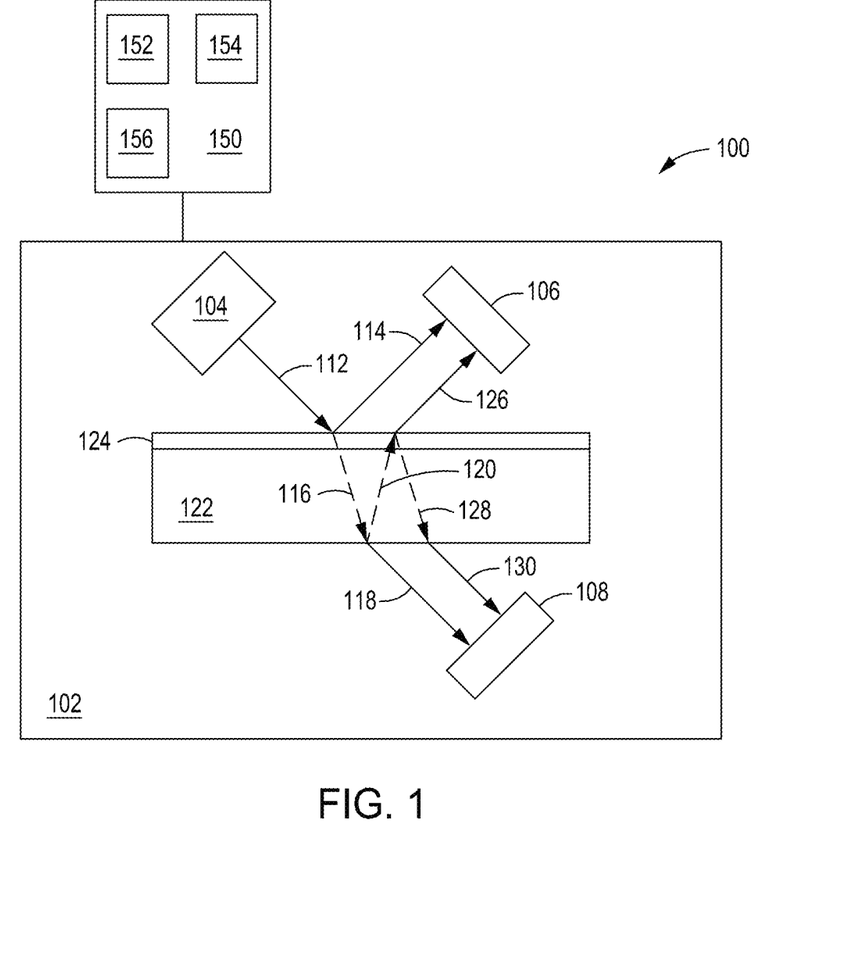
FIG. 1 depicts a cross-sectional view of a metrology apparatus detecting amplitude data only in accordance with some embodiments of the present principles.

In a view 100 of FIG. 1 is a metrology apparatus 102 such as, but not limited to, an FTIR-based metrology system that uses an illumination source apparatus 104, a reflection detector 106, and a transmission detector 108. In some embodiments, the illumination source apparatus 104 may be a broadband illumination source. An illumination beam 112 is directed at a substrate 122 with a film layer 124. In some embodiments, the film layer 124 may comprise a film stack of two or more layers. A first reflection beam 114 is detected by the reflection detector 106. A first transmission beam 116 propagates through the substrate 122 and film layer 124 and creates a first reflected transmission beam 120 and a second transmission beam 118. The second transmission beam 118 is detected by the transmission detector 108. The first reflected transmission beam 120 forms a second reflection beam 126 and a third transmission beam 128. The second reflection beam 126 is detected by the reflection detector 106. The third transmission beam 128 forms a fourth transmission beam 130 which is detected by the transmission detector 108. Although a limited number of reflected and transmission beams are depicted in FIG. 1, many more transmitted and reflected beams are formed and detected when the substrate 122 and film layer 124 are illuminated by the illumination source apparatus 104.

A controller 150 controls the operation of the metrology apparatus 102 using a direct control of the metrology apparatus 102 or alternatively, by controlling the computers (or controllers) associated with the metrology apparatus 102. In operation, the controller 150 enables data collection and feedback from the respective systems to optimize performance of the metrology apparatus 102 in detecting absorption characteristics of the substrate 122 and film layer 124. The controller 150 generally includes a Central Processing Unit (CPU) 152, a memory 154, and a support circuit 156. The CPU 152 may be any form of a general-purpose computer processor that can be used in an industrial setting. The support circuit 156 is conventionally coupled to the CPU 152 and may comprise a cache, clock circuits, input/output subsystems, power supplies, and the like. Software routines, such as a method as described herein may be stored in the memory 154 and, when executed by the CPU 152, transform the CPU 152 into a specific purpose computer (controller 150). The software routines may also be stored and/or executed by a second controller (not shown) that is located remotely from the metrology apparatus 102.

The memory 154 is in the form of computer-readable storage media that contains instructions, when executed by the CPU 152, to facilitate the operation of the semiconductor processes and equipment. The instructions in the memory 154 are in the form of a program product such as a program that implements the methods of the present principles. The program code may conform to any one of a number of different programming languages. In one example, the disclosure may be implemented as a program product stored on a computer-readable storage media for use with a computer system. The program(s) of the program product define functions of the aspects (including the methods described herein). Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the methods described herein, are aspects of the present principles.

Figure 2:
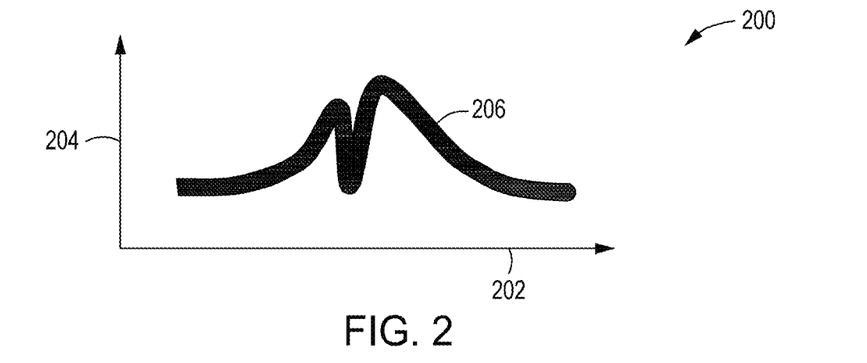
FIG. 2 depicts a spectral plot based on amplitude only in accordance with some embodiments of the present principles.

When the metrology apparatus 102 is configured to detect only amplitudes of the transmitted and reflected beams a spectral plot 200 as depicted in FIG. 2 is obtained for either the transmitted beams or the reflected beams. For example, an amplitude only reflection curve 206 is obtained by plotting detected amplitude reflection data (from reflection detector 106) over a spectrum 202 versus amplitude 204. In general, the amplitude only reflection curve 206 shows averaged values over a spectrum range. In a similar fashion, a transmission curve (not shown) may also be obtained by plotting detected transmission data (from transmission detector 108) over the spectrum 202 versus amplitude 204. The transmission curve would also show averaged values over the spectrum range.

Figure 3:
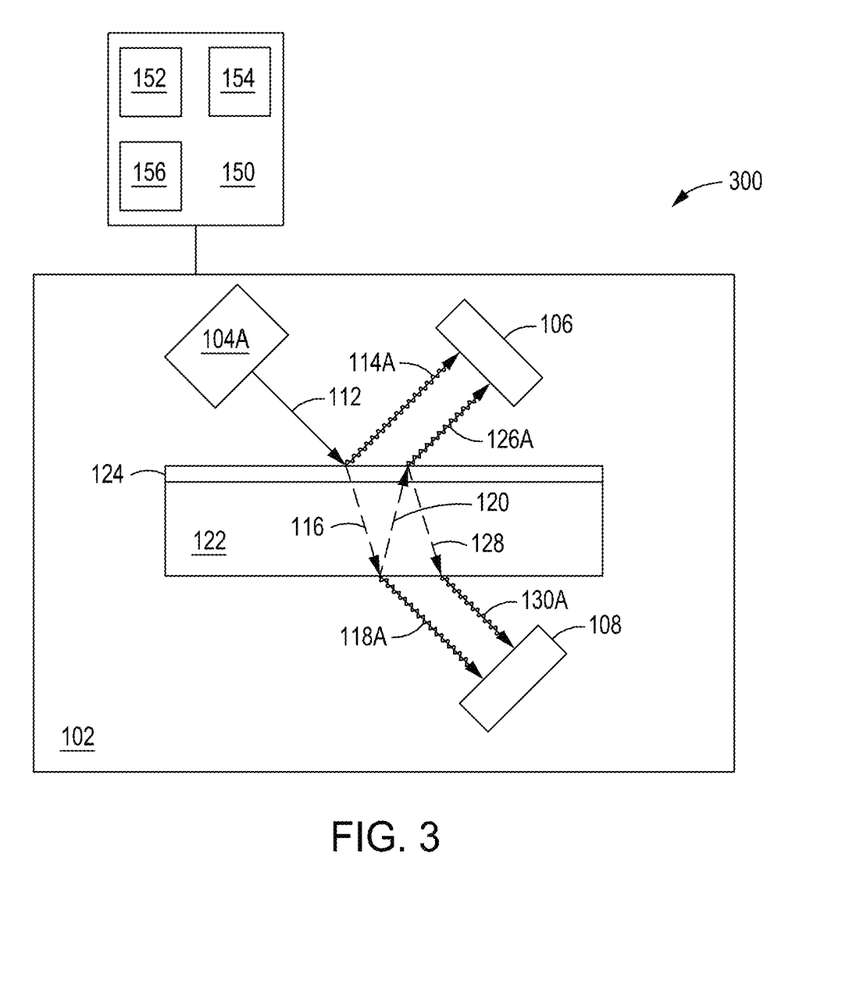
FIG. 3 depicts a cross-sectional view of a metrology apparatus detecting amplitude and phase data in accordance with some embodiments of the present principles.

In a view 300 of FIG. 3 is the metrology system 102 has been altered to incorporate methods of the present principles. The illumination source apparatus 104A is changed to allow for a higher resolution of detection so that the reflection detector 106 and the transmission detector 108 can obtain not only amplitude information but also phase information for transmitted and reflected signals. The first reflection beam 114A and second reflection beam 126A now contain phase information that can be detected by the reflection detector 106. Similarly, the second transmission beam 118A and the fourth transmission beam 130a now contain phase information that can be detected by the transmission detector 108.

Figure 4:
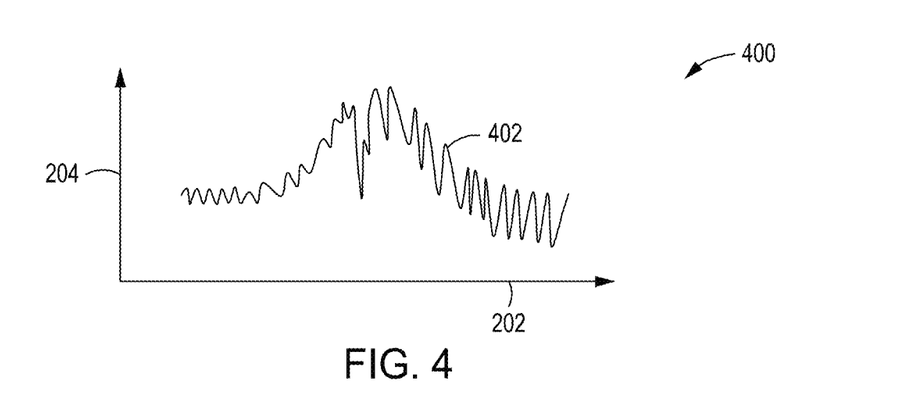
FIG. 4 depicts a spectral plot based on amplitude and phase data in accordance with some embodiments of the present principles.
Figure 5:
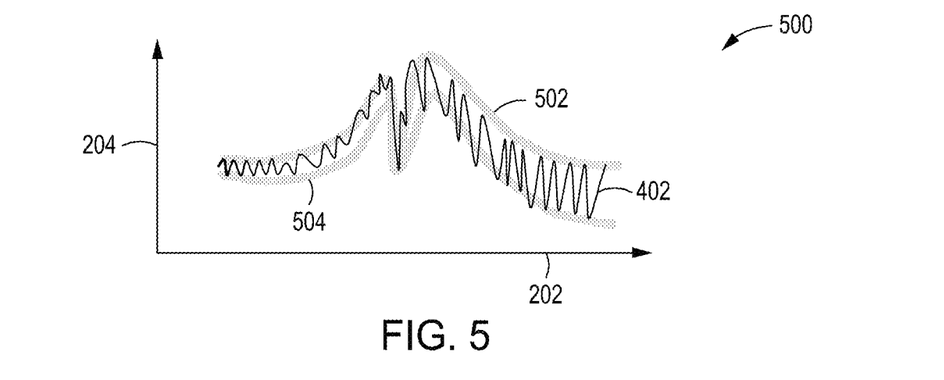
FIG. 5 depicts a spectral plot maxima and minima envelopes in accordance with some embodiments of the present principles.

When the metrology apparatus 102 is configured to detect amplitudes and phases of the transmitted and reflected beams, a spectral plot 400 as depicted in FIG. 4 is obtained for either the transmitted beams or the reflected beams. For example, an amplitude and phase reflection curve 402 is obtained by plotting detected amplitude and phase reflection data (from reflection detector 106) over the spectrum 202 versus the amplitude 204. In general, the amplitude and phase reflection curve 402 shows substantially greater detail (e.g., additional peak and valley detail, etc.) than the amplitude only reflection curve 206 of FIG. 2. A similar spectral plot can also be constructed for the amplitude and phase transmission data obtained from the transmission detector 108. A standalone analyzer or an integrated analyzer such as, for example, the controller 150, may be used to further process the amplitude and phase reflection curve 402 as depicted in a spectral plot 500 in FIG. 5. A best fit process can be used to obtain a maxima amplitude and phase reflection curve 502 and a minima amplitude and phase reflection curve 504. The maxima and minima amplitude and phase reflection curves may also be obtained through calculations based on the data points from the amplitude and phase reflection curve 402. Similar processing is also performed for the amplitude and phase transmission curve to obtain the maxima and minima amplitude and phase transmission curve (not shown).

Figure 6:
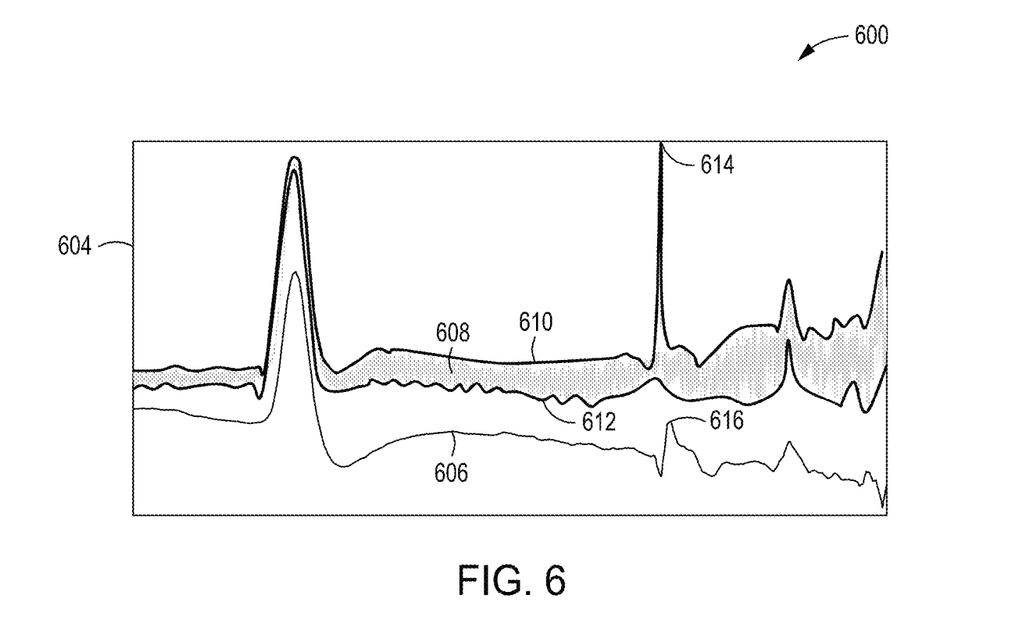
FIG. 6 depicts a spectral plot of amplitude and phase test data in accordance with some embodiments of the present principles.

In a spectral plot 600 of FIG. 6, an actual data sample is depicted for amplitude and phase reflection data that forms an amplitude and phase reflection curve 608. For comparison purposes, an amplitude only reflection curve 606 is also depicted. The data is plotted as amplitude 604 versus spectrum 602. As discussed above and in more detail below, a maxima amplitude and phase reflection curve 610 is determined as well as a minima amplitude and phase reflection curve 612. As shown in FIG. 6, the amplitude only reflection curve 606 does not provide as much detail (less sensitive) than the amplitude and phase reflection curve 608. For example, the peak 614 of the amplitude and phase reflection curve 608 is mostly removed from the peak 616 of the amplitude only reflection curve 606. Similar minima data is also not obtainable from the amplitude only reflection curve 606.

Figure 7:
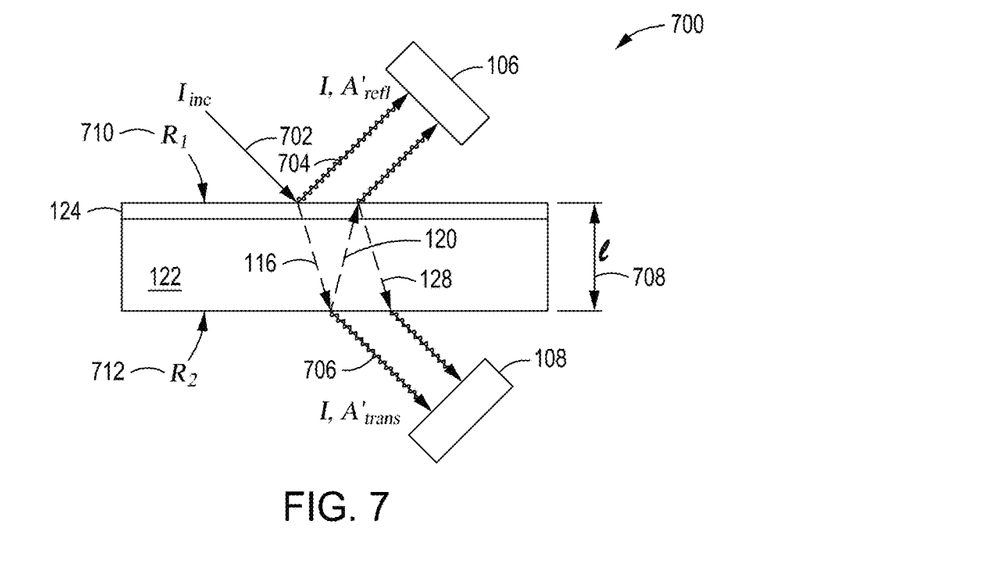
FIG. 7 depicts a cross-sectional view of reflection and transmission variables of a substrate and film accordance with some embodiments of the present principles.

In order to obtain the absorption characteristics of any film layers on a substrate and the substrate without any prior information (e.g., characteristics of the bare substrate, etc. as is normally required for FTIR processing), the substrate and film layers are modeled as an asymmetrical, lossy, Fabry-Perot etalon. The substrate is asymmetrical as only one surface of the substrate has film layers which affect the substrate's optical properties. The substrate is lossy (absorbs light) which is desirable in order to determine characteristics of the substrate and films. The substrate is treated as a cavity or fixed etalon based on Fabry-Perot interferometer principles (optical cavity with two parallel reflecting surfaces). The substrate has infinite reflections within the substrate, but the interior reflections converge into a single beam with a final single phase that can be determined as a converging infinite series. Based on such a modeling, the following equations can be used to solve for absorption parameters of the film and the substrate. References will be made to the view 700 of FIG. 7. for variable definitions of the equations. The amplitude of the transmitted beam 706 formed from the incident beam 702 is determined by Eq. 1:

$$A'_{trans} = \frac{I_{trans}}{I_{inc}} = \frac{(1-R_1)(1-R_2)e^{-\alpha prop \ell}}{\left(1 - \sqrt{R_1 R_2}\, e^{-\alpha prop \ell}\right)^2 + 4\sqrt{R_1 R_2}\, e^{-\alpha prop \ell} \sin^2(\phi)} \quad \text{(Eq. 1)}$$

where $R_1$ 710 is the reflection coefficient of the surface of the substrate with the film, $R_2$ 712 is the reflection coefficient of the surface of the substrate without the film, α (alpha) is the absorption amount, $\ell$ (length) 708 is the thickness of the film and substrate, ϕ (phi) is the phase of the combination of the phase of the film and the phase of the substrate, 'prop' is the propagation through the substrate and film, 'f' is the film, and 'sub' is the substrate. The amplitude of the reflected beam 704 formed from the incident beam 702 is determined by Eq. 2:

$$A'_{refl} = \frac{I_{left}}{I_{inc}} = \frac{\left(\sqrt{R_1} - \sqrt{R_2}\, e^{-\alpha prop \ell}\right)^2 + 4\sqrt{R_1 R_2}\, e^{-\alpha prop \ell} \sin^2\phi}{\left(1 - \sqrt{R_1 R_2}\, e^{-\alpha prop \ell}\right)^2 + 4\sqrt{R_1 R_2}\, e^{-\alpha prop \ell} \sin^2\phi} \quad \text{(Eq. 2)}$$

The total absorption or total loss for the propagation through the substrate and film is represented by Eq. 3 where 'd' is the distance or thickness and 'K' is a given value of a spectrum:

$$\alpha_{prop}(k)l = \alpha_f(k)d_f + \alpha_{sub}(k)d_{sub} \quad \text{(Eq. 3)}$$

The phase is determined for a given spectrum value by Eq. 4:

$$\phi(k) = k\{n_f(k)d_f + n_{sub}(k)d_{sub}\}\cos(\theta_t) \quad \text{(Eq. 4)}$$

The upper (maxima) and lower (minima) envelope can be determined by Eq. 5:

$$\sin^2(\phi) = 0\big|_{\Phi=min} \text{ or } = 1\big|_{\Phi=max} \quad \text{(Eq. 5)}$$

The minimum and maximum phase value for a given spectrum value can be determined by Eq. 6:

$$\phi_{max}(k) = \frac{4N+2}{2}\pi \quad \phi_{min}(k) = N2\pi_{12} \quad N = 0, 1, 2, \ldots \quad \text{(Eq. 6)}$$

The phase delta between adjacent peaks of the phase can be determined by Eq. 7:

$$\underset{\substack{\text{between adjacent peaks}\\ \text{known from eqn. (6)}}}{\Delta \phi_{min,max}} = \underset{\substack{\text{known from}\\ \text{adjacent peaks}}}{\Delta k_i} \cdot \left\{\underset{fixed}{\Delta n_f(k_i) \cdot d_f} + \underset{fixed}{\Delta n_{sub}(k_i) \cdot d_{sub}}\right\} \quad \text{(Eq. 7)}$$

To resolve the absorption values for the substrate and the film, the maxima envelope and the minima envelope determined from the amplitude and phase data from the reflections is used along with the maxima envelope and the minima envelope determined from the amplitude and phase data from the transmissions. The reflection data produces two equations (max and min envelope curves) and the transmission data produces two equations (max and min envelope curves) for a total of four equations. Thus, equations 1 and 2 produce two equations each (4 total) for $\sin^2(\phi)=0,1$ @ $\phi_{min,\,max}$ (from Eq. 6), respectively. $A'_{trans}$ and $A'_{refl}$ @ $\phi_{min,max}$ can be obtained from the raw FTIR spectra. Four equations are produced with 4 unknowns ($R_1(k), R_2(k), \alpha_f(k), \alpha_{sub}(k)$) that can be optimized numerically. Furthermore, since $R=(n_1-n_2)/(n_1+n_2)$ then Eq. 7 can be used to further optimize $n_f(k)$ and $n_{sub}(k)$, and subsequently $R_1(k), R_2(k)$. Both absorption profiles for the substrate and the film can be obtained $\alpha_f(k), \alpha_{sub}(k)$.

Figure 8:
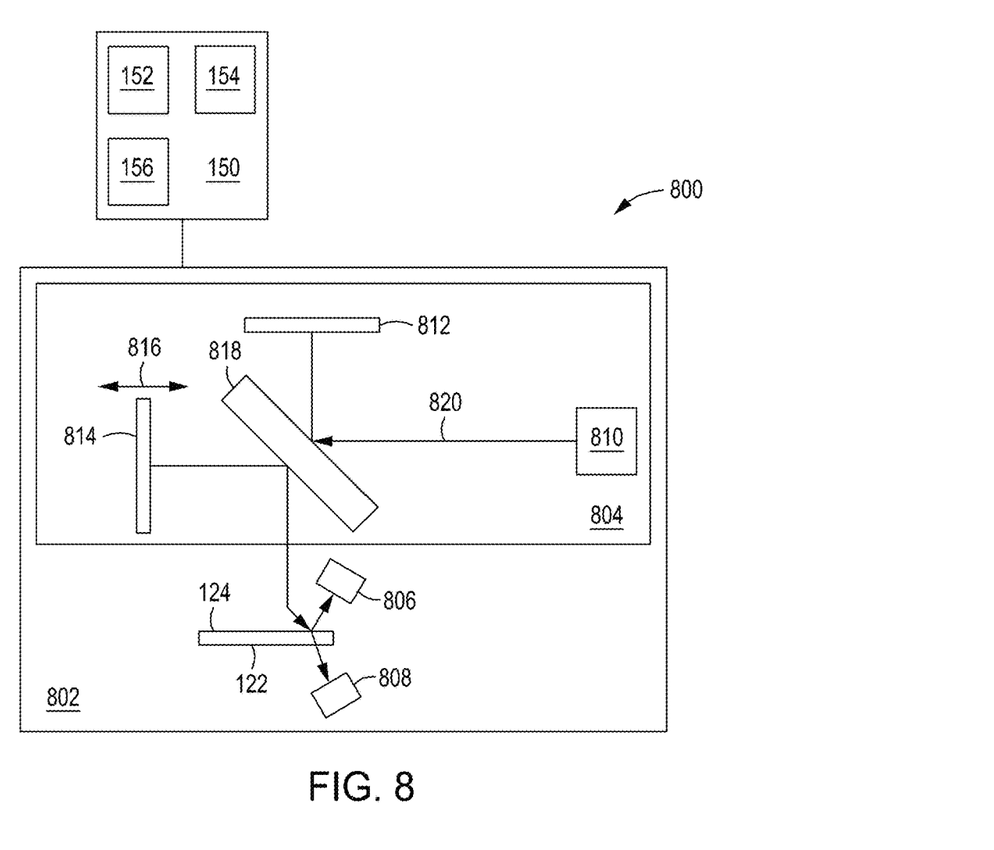
FIG. 8 depicts a cross-sectional view of a metrology apparatus based on FTIR (Fourier transform infrared) analysis in accordance with some embodiments of the present principles.

As an example implementation, and not meant to be limited to only FTIR metrology, a metrology apparatus 802 that can be used as an inline FTIR assembly is depicted in a view 800 of FIG. 8. The metrology apparatus 802 includes an illumination source apparatus 804 which includes a broadband infrared source 810 that provides an illumination beam 820 to a beam splitter 818 that splits the illumination beam 820 to a fixed mirror 812 and to a moving mirror 814 that can travel 816 an X distance for a given step. The metrology apparatus 802 also includes a reflection detector 806 and a transmission detector 808 that detects reflections and transmissions, respectively, through the substrate 122 and the film layer 124. The metrology apparatus 802 has a controller 150 that is used to control the metrology apparatus 802 and to perform metrology processes and analysis of the substrate 122 and film layer 124. In order to obtain phase information for transmissions or reflections, the metrology apparatus 802 has the FTIR processing recipe set to a spectral resolution at a low setting by using one of two example techniques. A first example technique is to set an interferometer arm (not shown) on the moving mirror 814 to a step size (X distance) less than the shortest wavelength in an illumination band of the broadband infrared source 810. For example, if the illumination band has wavelengths of 2 µm to 25 µm, the step size is less than 2 µm (e.g., 1 µm, etc.).

A second example technique is to set the interferometer arm on the moving mirror 814 at a lowest possible continuous speed, v, (e.g., 1 µm/s) with a fast detector at a sampling rate greater than the velocity divided by the shortest wavelength of the illumination band (e.g., $v/\lambda_{shortest}$=100 µm/s/1 µm=100 Hz). Spectra data should be collected with minimal noise for both reflection and transmission channels simultaneously. For each of the reflection/transmission channels, the controller 150 or other analyzer can create two spectra from the interpolations of the minima and maxima which results in a total of four spectra. For each of the new four spectra, optimize Eqs. (1) and (2) by floating $R_1(k)$, $R_2(k)$, $\alpha_f(k)$, $\alpha_{sub}(k)$ and minimizing the residuals between the equations above the numerical fit, repeating until the residual is less than a reasonable value (e.g., less than 1% of area-under-curve difference). Any other numerically or analytically equivalent method that can lead to simultaneous optimization of Eqs. (1) to (7) and a solution for $\alpha_f(k)$, $\alpha_{sub}(k)$ may also be utilized.

Embodiments in accordance with the present principles may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

While the foregoing is directed to embodiments of the present principles, other and further embodiments of the principles may be devised without departing from the basic scope thereof.

The invention claimed is:

1. A method for determining an absorption profile for a film on a substrate, comprising:
    illuminating the substrate with a broadband spectrum;
    obtaining amplitude and phase for reflection beams from a first surface of the substrate;
    obtaining amplitude and phase for transmission beams propagating through the substrate and beyond a second surface of the substrate;
    forming a model of the substrate by coupling the amplitude and phase of the reflection beams and the amplitude and phase of the transmission beams to form a phase-resolved signal with a first sub-signal at a first end of a Standing-Wave-Ratio (SWR) envelope that resolves top layer information and a second sub-signal at a second end of the SWR envelope that resolves substrate bulk information;
    determining the absorption profile of the film on the substrate and the substrate based on the model of the substrate; and
    using the absorption profile to perform a corrective action during processing of the film or substrate.

2. The method of claim 1, wherein the film is an epitaxial layer.

3. The method of claim 1, wherein processing of the film or substrate includes physical vapor deposition, chemical vapor deposition, or resist layer deposition.

4. The method of claim 1, wherein the film has a thickness of one atomic layer.

5. The method of claim 1, wherein the film is a stack of two or more film layers.

6. The method of claim 1, wherein the substrate is silicon, silicon carbide, quartz, or sapphire.

7. The method of claim 1, wherein the broadband spectrum includes wavelengths of approximately 2 microns to approximately 20 microns.

8. The method of claim 1, wherein a single source is used to illuminate the substrate.

9. The method of claim 1, wherein obtaining the amplitude and phase of the transmission beams and the amplitude and phase of the reflection beams includes scanning at a speed that resolves fringes of amplitudes and phases.

10. The method of claim 1 is performed without prior substrate pre-measurements.

11. The method of claim 1, wherein the film is composed of an unknown material.

12. A non-transitory, computer readable medium having instructions stored thereon that, when executed, cause a method for determining an absorption profile for a film on a substrate to be performed, the method comprising:
    illuminating the substrate with a broadband spectrum;
        obtaining amplitude and phase for reflection beams from a first surface of the substrate;
        obtaining amplitude and phase for transmission beams propagating through the substrate and beyond a second surface of the substrate;
        forming a model of the substrate by coupling the amplitude and phase of the reflection beams and the amplitude and phase of the transmission beams to form a phase-resolved signal with a first sub-signal at a first end of a Standing-Wave-Ratio (SWR) envelope that resolves top layer information and a second sub-signal at a second end of the SWR envelope that resolves substrate bulk information; and
        determining the absorption profile of the film on the substrate and the substrate based on the model of the substrate.

13. The non-transitory, computer readable medium of claim 12, wherein the broadband spectrum includes wavelengths of approximately 2 microns to approximately 20 microns.

14. The non-transitory, computer readable medium of claim 12, wherein the film is a stack of two or more film layers.

15. The non-transitory, computer readable medium of claim 12, wherein obtaining the amplitude and phase of the transmission beams and the amplitude and phase of the reflection beams includes scanning at a speed that resolves fringes of amplitudes and phases.

16. The non-transitory, computer readable medium of claim 12, wherein the method is performed without prior substrate pre-measurements.

17. A metrology apparatus for determining an absorption profile for a film on a substrate, comprising:
    a broadband illumination source configured to produce an infrared (IR) illumination band beam;
    a beam splitter configured to split the IR illumination band beam;
    a fixed mirror configured to receive the IR illumination band beam;

a movable mirror configured to receive the IR illumination band beam and move to alter resolution of the metrology apparatus;

a reflection detector configured to obtain amplitude and phase of a reflection of the IR illumination band beam;

a transmission detector configured to obtain amplitude and phase of a transmission of the IR illumination band beam through the film and the substrate; and a controller configured to alter a step distance of the movable mirror to less than a shortest wavelength in the IR illumination band beam or to alter a velocity of the movable mirror to a lowest possible continuous velocity wherein the reflection detector and the transmission detector are configured to detect at a sampling rate greater than the velocity divided by a shortest wavelength of the illumination band beam.

18. The metrology apparatus of claim 17, wherein the IR illumination band beam includes wavelengths of approximately 2 microns to approximately 25 microns.

19. The metrology apparatus of claim 17, wherein the step distance is less than approximately 2 microns.

20. The metrology apparatus of claim 17, wherein the sampling rate is approximately 100 Hz.

\* \* \* \* \*